United States Patent
Atur et al.

(10) Patent No.: US 12,554,301 B2
(45) Date of Patent: Feb. 17, 2026

(54) ESTIMATING POWER CONSUMPTION OF SOFTWARE WORKLOADS

(71) Applicant: Rakuten Symphony, Inc., Tokyo (JP)

(72) Inventors: Sree Nandan Atur, San Jose, CA (US); Mruthyunjaya Navali, Tewksbury, MA (US)

(73) Assignee: Rakuten Symphony, Inc., Tokyo (JP)

( * ) Notice: Subject to any disclaimer, the term of this patent is extended or adjusted under 35 U.S.C. 154(b) by 63 days.

(21) Appl. No.: 18/456,946

(22) Filed: Aug. 28, 2023

(65) Prior Publication Data
US 2025/0076943 A1    Mar. 6, 2025

(51) Int. Cl.
| | |
|---|---|
| *G06F 1/26* | (2006.01) |
| *G06F 1/3209* | (2019.01) |
| *G06F 9/38* | (2018.01) |
| *G06F 11/30* | (2006.01) |
| *G06F 11/34* | (2006.01) |

(52) U.S. Cl.
CPC ............ *G06F 1/26* (2013.01); *G06F 11/3062* (2013.01); *G06F 1/3209* (2013.01); *G06F 9/3885* (2013.01); *G06F 11/3409* (2013.01)

(58) Field of Classification Search
CPC ...... G06F 1/26; G06F 1/3209; G06F 11/3409; G06F 11/3062; G06F 9/3885
USPC ........................... 713/300, 310, 340; 702/182
See application file for complete search history.

(56) References Cited

U.S. PATENT DOCUMENTS

| | | | | |
|---|---|---|---|---|
| 2008/0082851 A1* | 4/2008 | Zettler | ...................... | G06F 1/28 713/340 |
| 2009/0007108 A1* | 1/2009 | Hanebutte | ........... | G06F 11/3062 718/1 |
| 2015/0039922 A1* | 2/2015 | Chalhoub | ............. | G06F 1/3296 713/323 |
| 2015/0089249 A1* | 3/2015 | Hannon | ................ | G06F 1/3287 713/300 |
| 2015/0377937 A1* | 12/2015 | Lafargue | ............. | G06F 11/3062 702/61 |
| 2016/0054774 A1* | 2/2016 | Song | ..................... | G06F 9/4881 713/320 |
| 2024/0338250 A1* | 10/2024 | Jo | ......................... | G06F 9/5094 |

* cited by examiner

*Primary Examiner* — Ji H Bae
(74) *Attorney, Agent, or Firm* — David R. Stevens; Stevens Law Group

(57) ABSTRACT

An energy estimator runs workloads to determine power consumed by processor cores in various power states and utilizations. This power consumption data is then used by an energy export agent for further calculations on different scenarios and cases. The energy export agent reads a total power consumption value from a CPU, data describing execution of processes from an operating system, and information regarding software components executing on the CPU from an orchestrator control plane. The agent uses data describing states of operating of the processor cores of the CPU and the total power consumption value to estimate power consumed by each processor core. Allocation and utilization of each processor core by a process and/or a container that spawned a process are then used to determine power consumption attributable to the process and/or container. A software hierarchy may be used to aggregate power consumption for applications, namespaces, or other software components.

12 Claims, 5 Drawing Sheets

ESTIMATING POWER CONSUMPTION OF SOFTWARE WORKLOADS

BACKGROUND

Field of the Invention

This invention relates to estimating power consumption of software workloads.

Background of the Invention

Enterprises with a large number of computing devices, such as data centers or telecommunication networks, must manage the amount of power consumed. Some prior solutions for monitoring power usage, such as KEPLER (KUBERNETES Efficient Power Level Exporter), require a sidecar container per application and an offline system to perform analysis and estimation. Prior approaches therefore require significant computing resources on each computing device being monitored, further adding to power consumption. Prior approaches to power monitoring are simply not appropriate for installations that require real-time performance and/or have low computing resources, such as edge servers in a telecommunication network.

SUMMARY OF THE INVENTION

In one aspect of the invention, a system includes a computing device including a central processing unit comprising a plurality of processor cores and one or more memory devices operably coupled to the central processing unit. The one or more memory devices store executable code that, when executed by the central processing unit, causes the central processing unit to: measure, by the central processing unit, total power consumption for the central processing unit; measure, by the central processing unit, residency of each processor core of the plurality of processor cores in a plurality of operating states ("cstates"); measure, by an operating system executing on the central processing unit, utilization of each processor core of the plurality of processor cores by each process of a plurality of processes executing on the central processing unit; and estimate, by an agent executing on the central processing unit, power consumption of each process of the plurality of processes according to the total power consumption, residency, and utilization.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
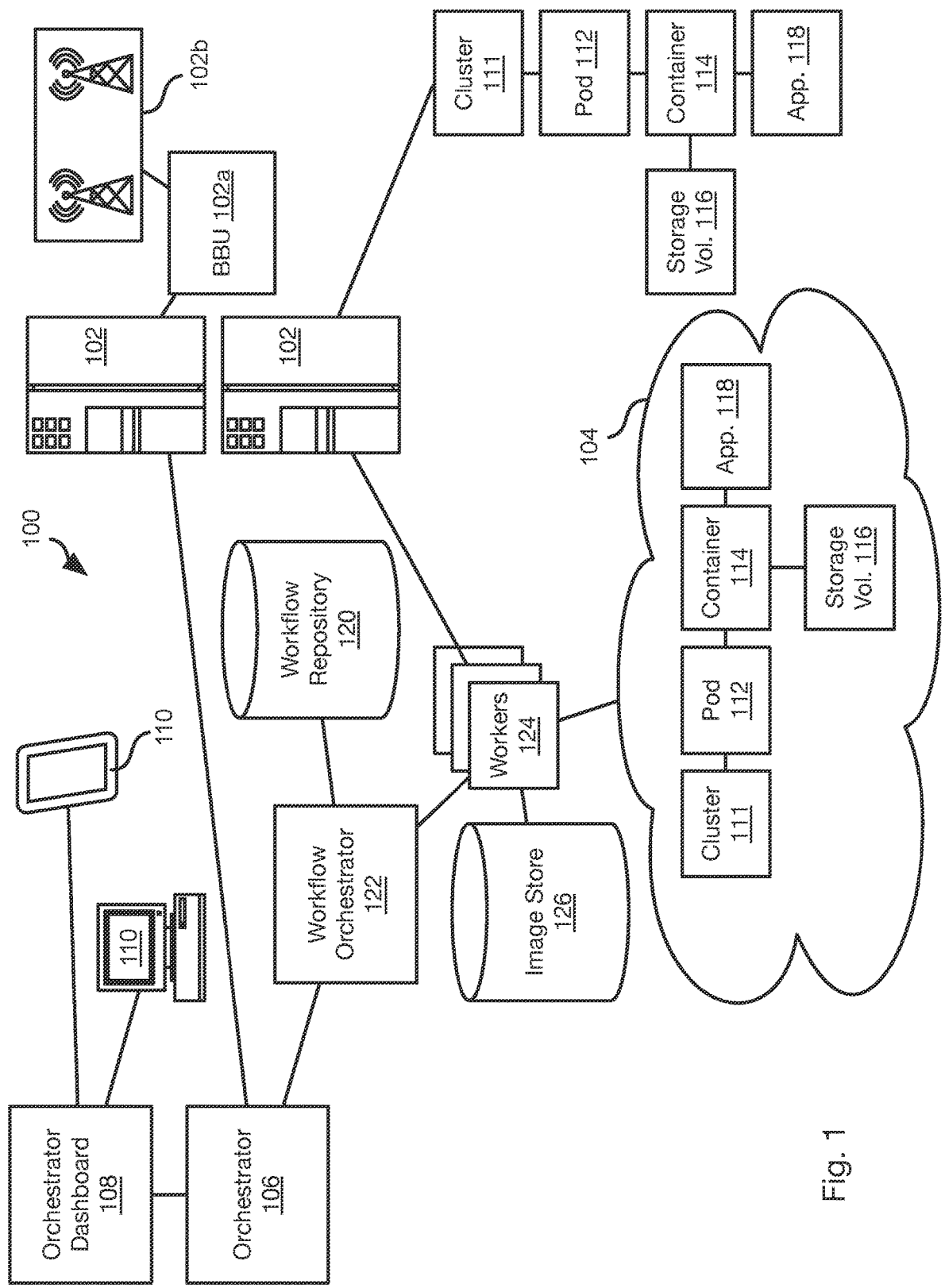
FIG. 1 is a schematic block diagram of a network environment in which payload objects may be transferred in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 600 of FIG. 6.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
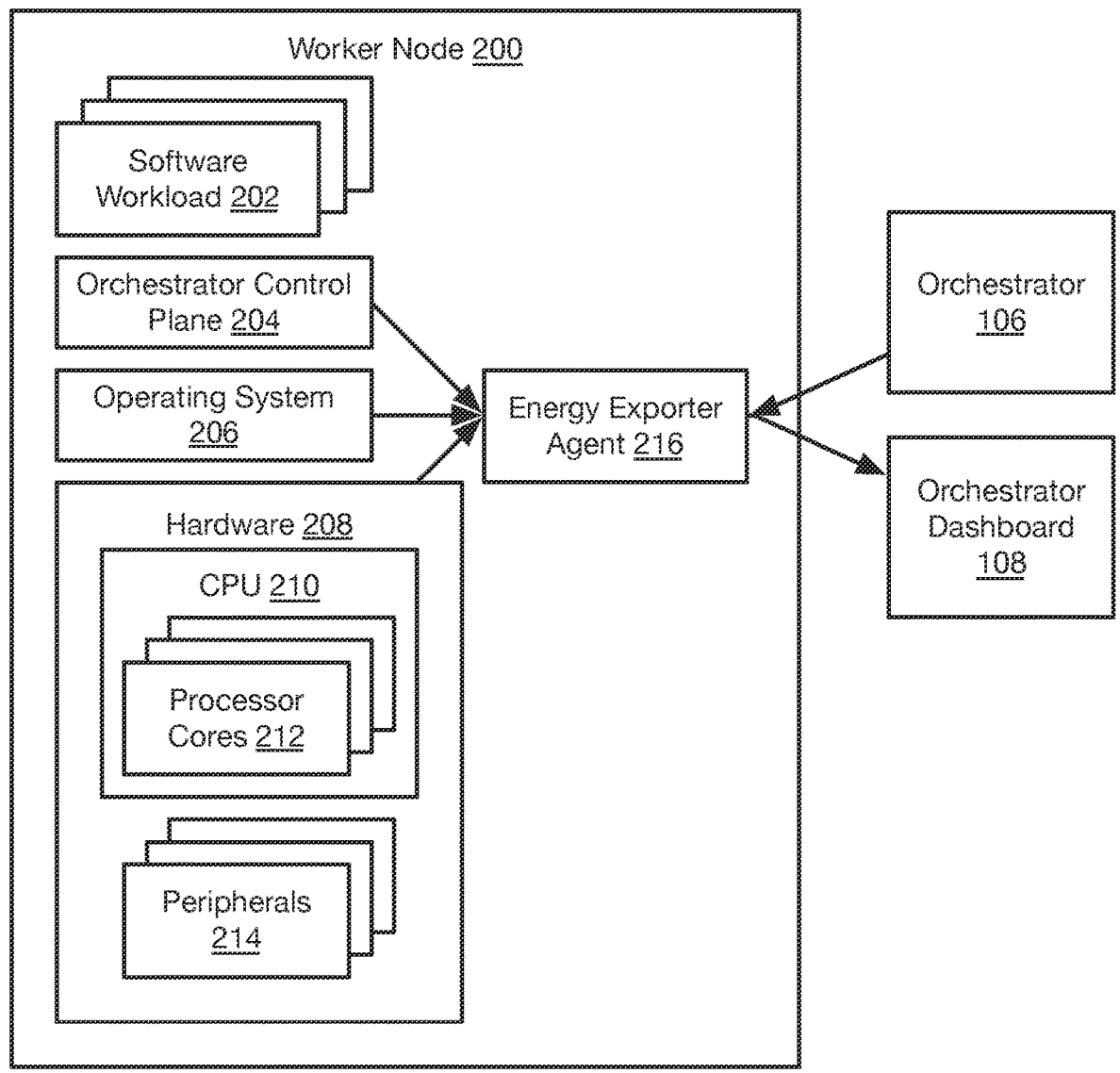
FIG. 2 is a schematic block diagram showing components for managing power consumption on a worker node in accordance with an embodiment.

Referring to FIG. 2, a worker node 200 may execute a software workload 202, such as a workload invoked by the workflow orchestrator 122, worker 124, or other workload. The worker node 200 may be a server 102, a portion of a server 102 (e.g., a blade in a rack server), or other computing device having some or all of the attributes of the computing device 600 of FIG. 6. A worker node 200 may also be implemented as computing resources of a cloud computing platform 104. A software workload 202 may include an application instance 118, a process spawned by an application instance 118, a container 114 hosting an application instance 118, software implementing a storage volume 116, software for implementing a pod 112 and/or cluster 111, or some other executable that executed on the worker node 200.

The worker node 200 may execute an orchestrator control plane 204 that is an agent of the orchestrator 106 or some other orchestration platform (e.g., KUBERNETES) that is used to implement orchestration facilitated by or subject to the control of the orchestrator 106. For example, the orchestrator control plane 204 may be a KUBERNETES control plane. The worker node 200 may execute an operating system 206, such as LINUX, ANDROID, WINDOWS, MACOS, IOS, or other operating system.

The worker node includes hardware 208, such as one or more central processing units (CPU) 210 each having one or more processor cores 212. As used herein, references to a processor core 212 and determining the power consumed by a processor core 212 may refer to a hyperthread executed by the CPU 210 for each core 212. Each processor core 212 may be functions as processor and have the ability to retrieve and execution instructions. In some embodiments, the orchestrator control plane 204 and operating system 206 are executed by a same core of a multi-core central processing unit (CPU).

The hardware 208 may include one or more peripheral devices 214. The peripheral devices may include any of the components described below with respect to the computing device 600 as being used in combination with a processor.

The worker node 200 may execute an energy exporter agent 216. In some embodiments, efficient operation is achieved by using a single energy exporter agent 216 per worker node 200. The energy exporter agent 216 receives information from some or all of the orchestrator control plane 204, operating system 206, and hardware 208 in order to estimate the amount of power consumed by a particular process or container executing on the worker node 200. Estimates of the energy exporter 216, or information used to obtain an estimate as described herein, may be transmitted to the orchestrator dashboard 108 to enable an administrator to view the amount of power consumed by an application instance 118, component of an application instance 118, a pod 112, a cluster, or other collection of software components executing in the network environment 100.

The energy exporter agent 216 may operate subject to the control of the orchestrator 106 and may receive information such as identifiers of components (applications 118, containers 114, storage volumes 116, pods 112, clusters 111) executing on the worker node 200 for which power consumption is to be estimated.

Figures 3, 4:
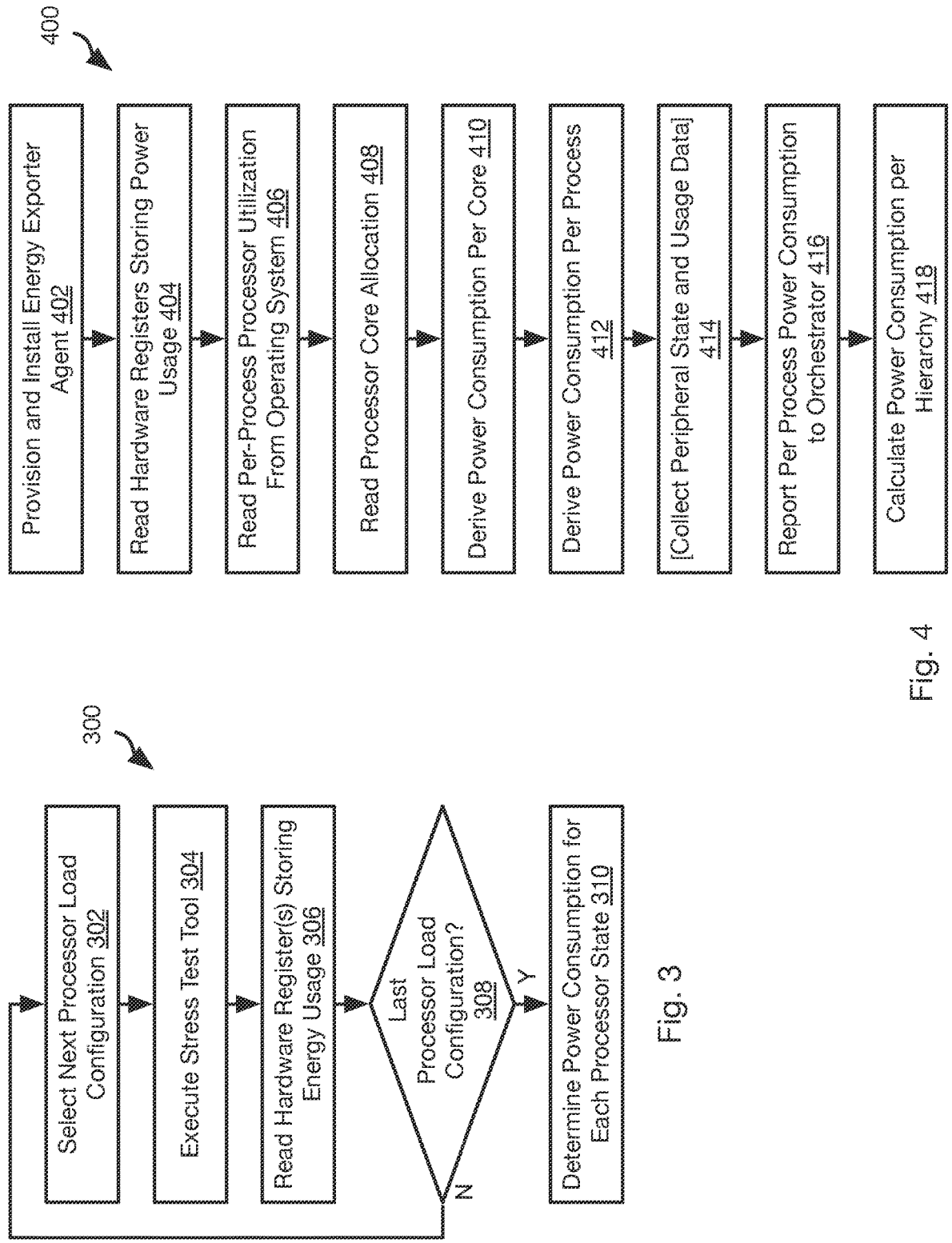
FIG. 3 is a process flow diagram of a method for characterizing power consumption of CPU cores in different states in accordance with an embodiment of the present invention.
FIG. 4 is a process flow diagram of a method for estimating power consumed by a particular process or container in accordance with an embodiment.

Referring to FIG. 3, each processor core 212 may operate in a plurality of states, referred to herein as "cstates." Each cstate has a different power consumption. Each make and model of CPU 210 may have different cstates. As used herein, $C_0$ refers an active mode in which executable code is being executed and core 212 is operating at maximum clock speed and in which the processor core 212 consumes the most power as compared to other cstates. In the remaining cstates ($C_1$ to $C_N$), the amount of time required to return to the $C_0$ cstate increases with increasing index value (e.g., $C_n$ takes longer to return to $C_0$ than $C_{n-1}$, etc., where n is a value from 2 to N−1). Likewise, the amount of power consumed by a cstate decreases with index value (e.g., $C_n$ consumes less power than $C_{n-1}$). In some of the cstates, e.g., $C_1$ to $C_M$, M<N, the processor core 212 is still able to execute instructions. In other cstates, the processor core 212 is not able to execute instructions, e.g., $C_{M+1}$ or $C_{M+1}$ to $C_{N-1}$. Power consumption is reduced by such actions as turning off power to the processor core 212, turning off and/or slowing down a clock, flushing caches to memory, storing an execution state to memory, or other actions.

For a particular make and model of CPU 210, the method 300 may be executed in order to characterize the power consumption of each core 212 in each cstate $C_n$, n=0 to N−1. The method 300 may be executed by the worker node 200 or using a test device elsewhere. In either case, the worker node 200 may be configured with data obtained according to the method 300 in order to estimate power consumption as described herein.

The method 300 may include selecting 302 a next processor load configuration to test as a current load configuration. As used herein, "load configuration" refers to a desired set of cstates that a stress test induces in the processor cores 212 of the CPU 210. For example, let the processor cores 212 be designated $PC_1$ to $PC_J$, j=1 to J, where J is the number of processor cores 212. A non-exhaustive list of possible load configurations may therefore be defined as listed below in Table 1.

TABLE 1

| Load Configurations | | | |
| --- | --- | --- | --- |
| $PC_1$ | $PC_2$ | ... | $PC_J$ |
| $C_0$ | $C_0$ | ... | $C_0$ |
| $C_1$ | $C_0$ | ... | $C_0$ |
| $C_1$ | $C_1$ | ... | $C_0$ |
| ... | ... | ... | ... |
| $C_{N-1}$ | $C_{N-1}$ | $C_{N-1}$ | $C_{N-1}$ |

The load configurations may include all possible combinations of cstates $C_0$ to $C_{N-1}$ achievable using processor cores $PC_1$ to $PC_J$. Alternatively, only a subset may be used. For example, only those cstates that are capable of executing instructions plus a single representative of multiple cstates that are not capable of executing instructions. Other criteria may also be used to select which load configurations to test, such using any approach for implementing a "design of experiment" in order to achieve a balance between the amount of information obtained and the amount of time spent.

The method 300 may include executing 304 the stress test tool in order to induce the CPU 210 to achieve the cstates of the current load configuration. For example, the stress test tool may be the "stress-ng" tool offered by many LINUX distributions.

The method 300 may include reading 306 one or more hardware registers of the CPU 210 in order to determine the power consumption of the CPU 210 during execution 304 of the stress test tool. For example, step 306 may include reading the model-specific register (MSR) of the CPU 210, the running average power limit energy reporting (RAPL) register, or some other register. The hardware registers may be defined according to any CPU 210 design known in the art, such as CPUs provided by INTEL, AMD, ARM, APPLE, or other manufacturer of CPUs. Specifically, step 306 may include reading a register indicating current power consumption of the CPU 210. Step 306 may be performed repeatedly over a time period, e.g., every second, to either (a) obtain a plurality of values that can be averaged and/or (b) to determine when the power consumption has stabilized such that an accurate sample may be read.

The value or values read at step 306 may be stored in association with the current load configuration. If the last load configuration is found, at step 310, to have been tested, the method 300 ends. Otherwise, another load configuration that has not been tested is selected as the current load configuration at step 302 and steps 304-308 are repeated.

Once all the load configurations, i.e., all possible or all selected according to some criteria or algorithm, are found 308 to have been tested, the method 300 may then include determining 310 the power consumption of each processor core 212 when in each cstate. Step 310 may include determining a power factor $PF_n$ for each cstate $C_n$, n=0 to N−1. The power factor $PF_n$ does not necessarily correspond to power consumed in each cstate but rather may be an estimate indicating power consumption relative to the $C_0$ cstate, e.g., $PF_0=1$ and $PF_n<1$, for n=1 to N−1.

For example, let $Y_q$, q=1 to Q, be the power consumption read for each load configuration q, where Q is the total number of load configurations. Accordingly, a system of equations may be according to (1), where $L_{qn}$ is the number of processor cores in cstate n for load configuration q $$Y_q = \sum_{n=0}^{N-1} L_{qn} PF_n \qquad (1)$$

The values for $PF_n$, n=0 to N−1 may then be solved for using linear algebraic techniques or any numerical method for obtaining exact or approximate solutions to a system of equations. In particular, the number of load configurations and corresponding equations may be much larger than the number of power factors $PF_n$ such that a numerical estimate may be more appropriate.

Step 310 may further include normalizing the power factors $PF_n$, e.g., $PF_n=PF_n/PF_0$ such that $PF_0$ is equal to 1 and $PF_1$ to $PF_{N-1}$ are decimal values less than 1. However, normalization may be omitted. Step 310 may include truncating the number of bits used to represent each power factor $PF_n$ to reduce storage requirements and simplify calculations. Power factors $PF_n$ with a value less than a threshold (either before or after normalization) may be set to zero.

FIG. 4 illustrates a method 400 that may be executed to estimate power consumption by process, container 114, or other software workload 202 executing on a worker node 200 and further estimate the power consumption of higher-level components that spawned the processes.

A step 402, the method 400 may include provisioning and installing the energy exporter agent 216 on the worker node

200. Step 402 may be performed by the orchestrator 106. The remaining steps of the method 400 may be performed by the energy exporter agent 216 except where otherwise noted. As described below, the functions of the energy exporter agent 216 are very simple and do not require a full containerized application in order to function. Likewise, the energy exporter agent 216 may function with respect to all software workloads 202 executing on a worker node 200, which is a further improvement over prior approaches. The energy exporter agent 216 may be implemented as a system daemon or other type of background process that executes periodically, such a period greater than between 1 and 20 seconds, between 2 and 15 seconds, or between 3 and 10 seconds.

The energy exporter agent 216 may be configured with the power factors $PF_n$, n=0 to N−1 corresponding to the make and model of the CPU 210, corresponding to the type or category of the CPU 210, or otherwise corresponding to the CPU 210. The energy export agent 216 may perform the method 300 or the method 300 or the method 300 may be performed on a separate device. In still other embodiments, the orchestrator dashboard 108 or some other component uses the power factors $PF_n$ to estimate power consumption.

The energy exporter agent 216 may read 404 one or more registers of the CPU 210 or other hardware registers of the worker node 200 to obtain the result of a power usage measurement performed by the CPU 210. For example, step 404 may include reading the MSR, RAPL, or other registers of the CPU 210. The value read from the one or more registers may reflect a current measurement of power usage at a sampling frequency of the CPU 210, which may be much higher than the sampling frequency of the energy exporter agent 216. However, over time, errors due to the low sampling frequency of the energy exporter agent 216 will become less significant.

Step 404 may further include reading cstate residency for each processor core from the hardware register. The cstate residency indicates the percentage of time each core 212 spends in each cstate. Again, the cstate residency may be calculated by the CPU 210 at a higher frequency than the sampling frequency of the energy exporter agent 216. However, over time, errors resulting from different sampling frequencies will diminish.

In some embodiments, the frequency of each processor core 212 may also be read. The frequency of each processor core 212 may be varied according to variation in usage of each processor. The variation in power usage by each processor core may also be taken into account. However, in other embodiments, variation in power usage due to variation in processor frequency is ignored.

The energy exporter agent 216 may then read 406 data describing per-process processor utilization from the operating system 206. A process is a set of instructions executed by the processor and has an associated processing context (e.g., values stored in registers of a processor core 212 when executing the process). The processing context of a process may be swapped out of the registers and stored in a cache or memory when not currently executed. Each process may have a process identifier (PID) and be instantiated by the operating system 206 and monitored and managed by the operating system 206. The processor utilization may be read directly from the operating system 206 or may be derived from other values read from the operating system 206. As for other values. The processor utilization that is read or derived may be used to represent an entire sampling period, even if the operating system 206 measures the process utilization, or data used to derive it, at a shorter sampling period.

In UNIX-based operating systems, the processor utilization may be derived from measured values including idle, iowait, user, nice, irq, sofirq, and steal as follows:

$$CPU\ \text{Idle} = \text{idle} + iowait. \quad\quad\quad 1$$

$$CPU\ \text{Total} = \text{user} + \text{nice} + \text{idle} + iowait + irq + softirq + \text{steal}. \quad\quad\quad 2$$

$$CPU\text{-Usage} = (CPU\text{-Total} - CPU\text{-Idle}) \quad\quad\quad 3$$

$$CPU\ Util\ \% = (CPU\text{-Usage})/(CPU\ \text{Total}) * 100. \quad\quad\quad 4$$

The method 400 may include reading 408 processor core allocations. The processor core allocations may be read from the operating system 206, e.g., from a configuration of the kernel of the operating system 206. The processor core allocations may also be received from the orchestrator control plane 204 or orchestrator 106, which may instruct the operating system 206 regarding allocation of processor cores 212 to specific software workloads 202. For example, a particular container 114 may be exclusively allocated to one or more processor cores 212. Accordingly, all processes spawned to implement the container 114 may execute on the allocated one or more processor cores 212. The processor core allocations may indicate that a particular application instance 118 is to share one or more processor cores 212 with one or more other applications 118 or processor cores 212 that are available for all processes executing on a CPU 210, including the operating system 206.

The energy usage per core 212 may be derived 410 using (a) the data read at steps 404-408 and (b) power factors $PF_n$, such as the power factors $PF_n$ obtained according to the method 300. For example, the following variables may be defined:

$Y$ = total $CPU$ power consumption (step 404), $PF_n$ = experimentally determined power factor for $Cstate\ n$, $n = 0$ to $N$(method 300)

$T_{ij}$ = time spent in $Cstate\ i$ by processor core $j$,

A value $F_j$ representing a fraction of power consumed by processor core j may be calculated according to j. A sum of all values $F_j$ may then be calculated according to (3). The estimated power consumption by each processor core j ($P_j$) may then be calculated according to (4). Note that assuming constant power consumption during a sample period $\Delta t$, the energy consumption $E_j$ of an individual processor core j during a sample period may be simply calculated as $E_j = P_j \Delta t$. Other more sophisticated techniques for approximating a time-varying signal based on discrete samples may be used.

$$F_j = \sum_{i=1}^{S} T_{ij} * PF_i \quad\quad (2)$$

$$F_T = \sum_{j=1}^{C} F_j \quad\quad (3)$$

$$P_j = Y * \frac{F_j}{F_T} \quad\quad (4)$$

The method 400 may then include deriving 412 the power consumption of processes executing on the processor cores 212, such as processes spawned by an application instance 118, a process executing a container 114 executing an application instance 118, a process implementing access to a storage volume 116, a process implementing the orchestrator control plane 204 or any other process executing on a worker node 200. For example, for a process k exclusively allocated to one or more processors j, the power consumed by the process k($A_k$) may be calculated according to (5) for each of the one or more processors (j), where $X_k$ is the processor utilization by process k.

$$A_k = X_k * P_j \quad (5)$$

Alternatively, for a process $A_k$ that is not exclusively allocated a processor, the amount of power consumed by the process $A_k$ may be estimated according to (6), where $X_{ik}$ is the percentage of processor utilization of processor j by process k.

$$A_k = \sum_{i=1}^{S} T_{ij} * PF_i * X_{ik} \quad (6)$$

The above examples are exemplary only. Various other approaches are described below. The approaches below presume that some or all of the following information has either been read from a hardware register, received from the operating system 206, obtained from the orchestrator control plane 204, or receive from the orchestrator 106:

For each container 114: processor core requirement and/or limit, memory requirement and/or limit, identifiers of allocated processor cores 212, start time (when the container 114 started execution).

Power factors $PF_n$ for each cstate.

Processor core power consumption in cstate $C_0$.

Cstate residency ratios (percentage of time spent by each processor core 212 in each cstate).

Current reading of processor core 212 cstate and utilization of processor cores 212 by each process and/or container 114

In the alternative approaches described below, it is assumed that PIDs that share a core also share the cstate residency. Dedicated and shared processor cores 212 are dealt with in the approaches described below. A dedicated processor core 212 is dedicated to a specific PID and/or container 114 and descendent processes spawned thereby. A shared processor core 212 is shared by multiple containers 114. In the case of shared cores, the actual cores used for execution may be determined or estimated in order to approximate processor core power usage by each process.

Usage values available for a dedicated processor core 212 includes the total time a process or container 114 to which the processor core 212 is dedicated has been executing. Usage values for a shared processor core 212 includes the total time spent executing each process or container 114 by each processor core 212 in a set of one or more shared processor cores 212. Usage values for a shared processor core 212 may be read from hardware registers or the operating system 206 (e.g., cpuacct.usage_percpu). For dedicated and shared processor cores 212, the time spent in each cstate during the lifetime (from spawn until current time) may be obtained for each processor core executing a container.

Processor cores 212 whether dedicated or shared may also be burstable. For example, a container 114 may temporarily have additional dedicated processor cores dedicate thereto. A container using one or more shared processor cores 212 may temporarily use more than an allocated percentage of the one or more shared processor cores 212.

In a first approach to estimating power consumption, cstates are disabled: each processor core 212 remains active, e.g., in $C_0$. The energy consumed by a container 114 is therefore the total time that processes having PIDs associated with the container 114 have been executing multiplied by the number of processor cores 212 allocated (e.g., dedicated processor cores 212) to the container 114 and the power consumed by each processor core 212 in cstate $C_0$.

In a second approach, cstates are enabled and the number of processors cores is a whole number that is either fixed of burstable. In the second approach, the power consumption of a container 114 may be calculated according to the following pseudocode:

For each processor core 212 assigned to the container 114:
For each cstate:

core_power_watts+=power@cstate*cstate residency ratio container_current_power_watts+=core_power_watts In the second approach "power@cstate" for cstate n may be obtained from multiplying a power factor $PF_n$ for cstate n by the power consumption of cstate $C_0$.

In a third approach, cstates are enabled and the number of processors cores need not be a whole number and is either shared or burstable. In the third approach, there are two possible cases.

In a first case of the third approach, processor cores 212 used by a container 114 are constrained to be a subset of cores by the orchestrator control plane 204, such as a KUBERNETES cluster controller. Step 412 may include obtaining a map of all sets of processor cores 212 (cpusets) of all containers 114 running on the worker node 200. A set of containers 114 ("the container set") that are sharing the same processor cores 212 ("the shared processor cores") is determined. If the sharing comes to 1 (sum of percentages of the shared processor cores allocated to the container set is equal to 100), then cstate residencies of the shared processor cores are also deemed shared among the PIDs of the container set. If the sharing is less than 1 (sum of percentages of shared processor cores allocated to the container set is equal to 100), then the remaining available allocated percentage is deemed to be in the lowest cstate (e.g., $C_6$) when calculating cstate residencies.

In a second case of the third approach, all shared processor cores are available for use by all containers 114 of a cluster 111. In the third approach, a "focused set" of processor cores may be identified by evaluating accounting usage of each processor core 212. For example, by identifying the PIDs and child PIDs associated with a processor core 212. For the remaining shared processor cores, allocation of power consumption is allocated equally to each container 114.

For example, a container 114 is allocated 2.5 cores of 31 shared cores. Accounting of usage of each processor core 212 shows processor cores 4, 14, 15, and 16 are used by the PIDs and child PIDs of the container 114. The power consumption of the container 114 may therefore be designated as 100% of the power consumption of processor cores 4 and 14 with the remaining 0.5 cores allocated to the container 114 being divided among the remaining processor cores 212 used: 25% of cores 15 and 16.

In the third approach, the amount of power used by each container 114 may be estimated according to the following pseudo code:

For each processor core 212 assigned to the container 114 (allocated per algorithm according to the first case or second case):
  For each cstate:
    core_power_watts+=power@cstate*cstate residency ratio*fractional sharing container_current_power_watts+=core_power_watts The value of "fractional sharing" may be the fraction of a processor core 212 allocated to a container 114 according to the first case or the fraction of a processor core 212 assigned to the container according to the second case (e.g., 25% in the example above).

In some embodiments, the method 400 may include collecting 414 peripheral usage data. However, such a step may be unnecessary due to insignificant contribution to power consumption and due to substantially constant utilization of peripherals, particularly in telecommunication applications. In other embodiments, power usage by peripherals is allocated to processes, such as in proportion to the estimated processor power usage attributed to each process according to the approach described herein.

The method 400 may include reporting 416, the per process (or per container) power consumption to the orchestrator 106. The orchestrator 106 may then use the per-process power consumption and a hierarchy of software components to calculate 418 the power consumption for a particular software component. Step 418 may also be performed by the energy exporter agent 216 such that step 416 may be omitted. For example, the energy exporter agent 216 may output the result of step 418 to the orchestrator 106 in response to a request from the orchestrator 106 triggered by an input from a user received through the orchestrator dashboard 108. The energy exporter agent 216 may obtain the hierarchy of software components from the orchestrator control plane 204 or directly from the orchestrator 106. The energy exporter agent 216 may use lightweight DOCKER containers and crictl APIs (container runtime interface (CRI) command line interface (CLI)) to obtain information regarding containers 114 and relationship to a software hierarchy, such as a KUBERNETES software hierarchy. Such an approach avoids using the slower KUBERNETES API's to get relationship between software components.

As noted, the power consumption may be integrated over time to obtain energy consumption. Power consumption is estimated at time points separated by the sampling period. Power consumption between these time points may be estimated by extrapolation or other approach for estimating a curve from discrete sample points. In some embodiments, power consumption measurements from spawning of a container 114, or other software component until a current time may be collected and aggregated.

Figure 5:
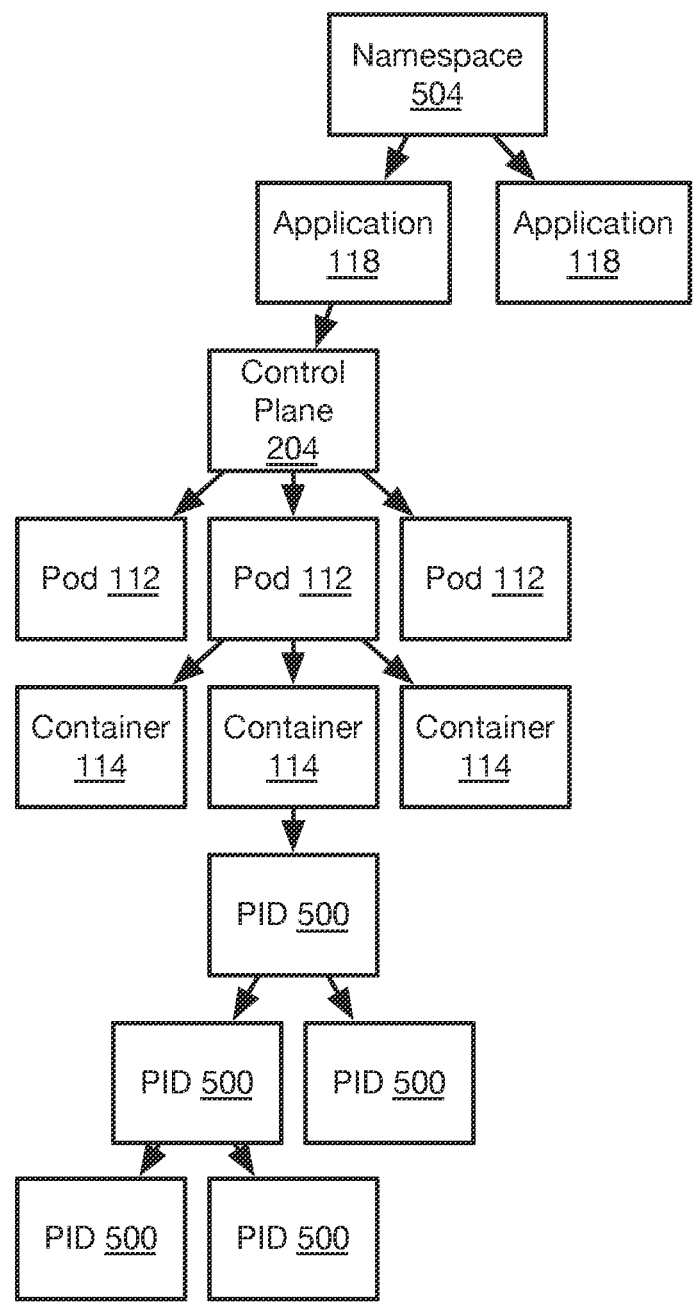
FIG. 5 illustrates a hierarchy of software components for which power consumption may be estimated in accordance with an embodiment.

Referring to FIG. 5, an application instance 118 may be controlled by the orchestrator control plane 204, which itself instantiates one or more pods 112. Each pod 112 manages execution of one or more containers 114 spawned by the orchestrator control plane 204 for executing the application instance 118. Each container executes at least one process represented by a PID 500. A particular process may launch child processes represented by PIDs. Likewise, child processes may launch grandchild processes represented by PIDs. There may be any number of levels of processes. Accordingly, the power consumption for the application instance 118 in a sample period may be estimated to be the sum of the power consumptions for that sample period for all PIDs 500 that are descendants of the application instance 118 in the illustrated hierarchy.

At a higher level of abstraction, the power consumption for one or more applications 118 belonging to a common namespace may be summed to obtain the power consumption for the namespace 504. In some instances, an application instance 118 may belong to multiple namespaces. The illustrated hierarchy is exemplary only. Any hierarchical representation of a plurality of software components may be represented and used to obtain the power consumption of a software component or group of software components.

The power consumption calculated as described above may be presented to a user in the orchestrator dashboard 108. Likewise, instructions as to which software components (application, namespace, etc.) for which power consumption is to be computed may be received through the dashboard 108 and executed. The power consumption calculated as described above may be used to determine power consumed for various scenarios and cases, such as power consumed by a type of software component, power consumed at certain times of day or some other time other interval, or other scenarios and cases.

The power and/or energy consumption for a software component may be evaluated by the orchestrator 106 with respect to one or more other metrics, e.g., key performance indicators (KPI), such as a rate at which the software component completes tasks that the software component is configured to perform, the cost of energy consumed, or other metric. For telecommunication and network function virtualization functions, network services, and network slice-level functionality, the ability to estimate power consumption with respect to a KPI may facilitate the optimization and tuning of software components in a telecommunication network, RAN, or cloud computing platform 104 in order to reduce operating expenses. Knowledge regarding the power consumption of components may provide insights to a human user or the orchestrator 106 regarding the scheduling and placement of software workloads 202. Power consumption of one or more software components may be visualized using a GRAFANA dashboard or some other visualization tool. Power consumption over time may be characterized statistically, stored for later use, or aggregated.

Figure 6:
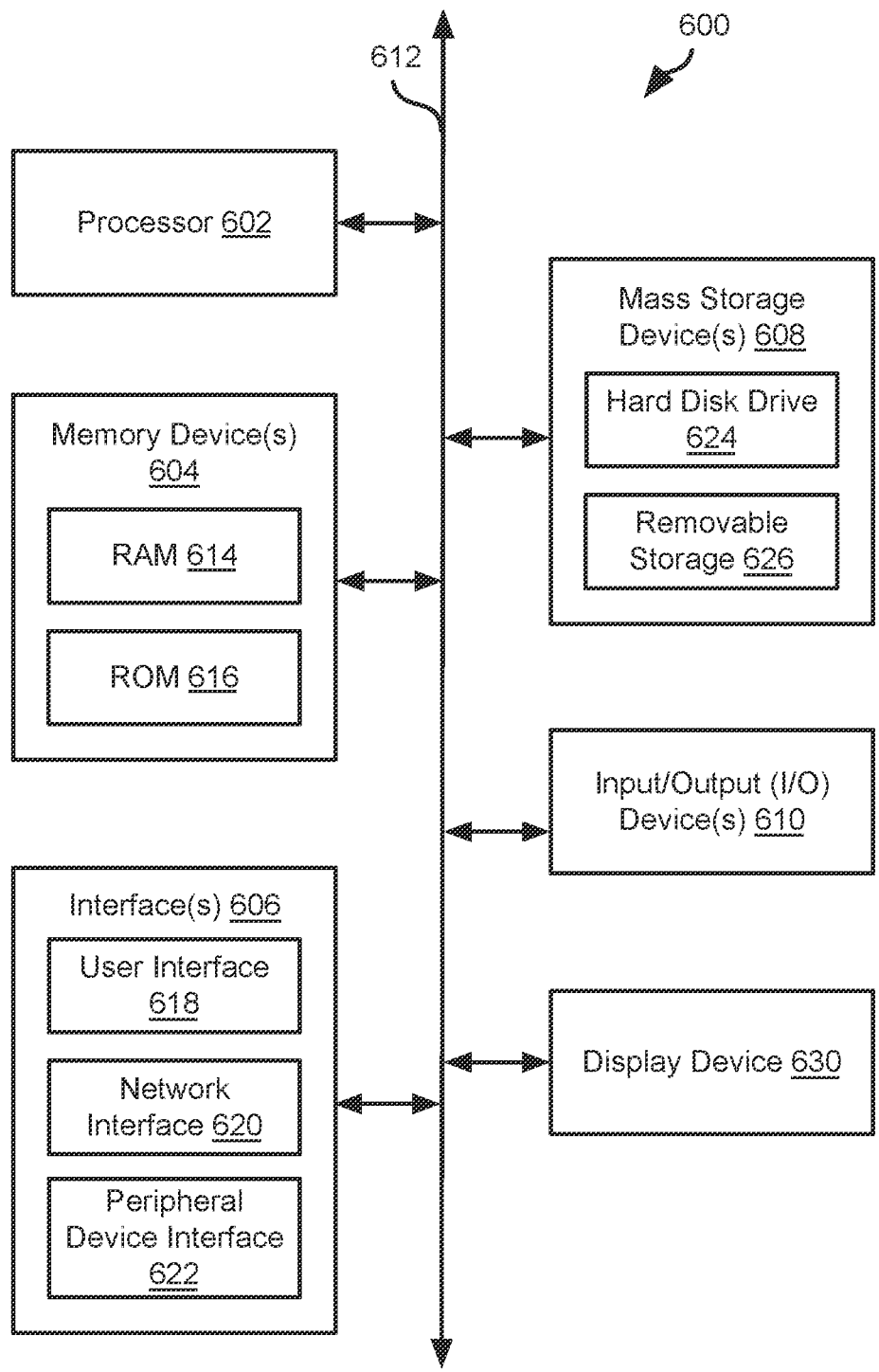
FIG. 6 is a schematic block diagram of an example computing device suitable for implementing methods in accordance with embodiments of the invention.

FIG. 6 is a block diagram illustrating an example computing device 600. Computing device 600 may be used to perform various procedures, such as those discussed herein. The servers 102, orchestrator 106, workflow orchestrator 122, cloud computing platform 104, and worker node 200 may each be implemented using one or more computing devices 600. The orchestrator 106, and workflow orchestrator 122 may be implemented on different computing devices 600 or a single computing device 600 may execute both of the orchestrator 106, and workflow orchestrator 122.

Computing device 600 includes one or more processor(s) 602, one or more memory device(s) 604, one or more interface(s) 606, one or more mass storage device(s) 608, one or more Input/output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, I/O device(s) 610, and display device 630 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising:
a computing device including a central processing unit comprising a plurality of processor cores and one or more memory devices operably coupled to the central processing unit, the one or more memory devices storing executable code that, when executed by the central processing unit, causes the central processing unit to:
calculate, by the central processing unit, a plurality of power factors, each power factor of the plurality of power factors indicating a relative power consumption of each operating state ("cstate") of a plurality of cstates of the plurality of processor cores, by:
executing stress tests using the plurality of processor cores for a plurality of load configurations inducing a plurality of combinations of cstates in the plurality of processor cores; and
evaluating power consumption of the central processing unit measured under the plurality of load configurations;
measure, by the central processing unit, total power consumption for the central processing unit while executing a plurality of processes;
measure, by the central processing unit, residency of each processor core of the plurality of processor cores in the plurality of cstates;
measure, by an operating system executing on the central processing unit, utilization of each processor core of the plurality of processor cores by each process of the plurality of processes; and
estimate, by an agent executing on the central processing unit, power consumption of each process of the plurality of processes according to the total power consumption, residency, and utilization using the plurality of power factors;
wherein the agent is configured to read the total power consumption from one or more registers of the central processing unit;
wherein the one or more registers include at least one of a model specific register (MSR) or a running average power limit energy reporting (RAPL) register.

2. The system of claim 1, wherein the agent is configured to transmit the power consumption of each process of the plurality of processes to an orchestrator.

3. The system of claim 1, wherein the operating system is configured to measure the utilization by measuring at least one of idle, iowait, user, nice, irq, sofirq, or steal for each processor core of the plurality of processor cores.

4. The system of claim 1, wherein the agent is further configured to:
obtain hierarchy information describing software components executing on the central processing unit; and
aggregate power consumption of a portion of the plurality of processes according to the hierarchy information.

5. The system of claim 4, wherein the agent is configured to obtain the hierarchy information using an application programming interface (API) for a container runtime interface executing on the central processing unit.

6. The system of claim 4, wherein the agent is configured to obtain the hierarchy information from an orchestrator control plane executing on the central processing unit.

7. A method comprising:
calculate, by a central processing unit including a plurality of processor cores, a plurality of power factors, each power factor of the plurality of power factors indicating a relative power consumption of each operating state ("cstate") of a plurality of cstates of the plurality of processor cores, by:
executing stress tests using the plurality of processor cores for a plurality of load configurations inducing a plurality of combinations of cstates in the plurality of processor cores; and
evaluating power consumption of the central processing unit measured under the plurality of load configurations;
reading, by the central processing unit, total power consumption for the central processing unit while executing a plurality of processes, from one or more registers of the central processing unit, the one or more registers including at least one of a model specific register (MSR) or a running average power limit energy reporting (RAPL) register;

measuring, by the central processing unit, residency of each processor core of the plurality of processor cores in the plurality of cstates;

measuring, by an operating system executing on the central processing unit, utilization of each processor core of the plurality of processor cores by each process of the plurality of processes; and estimating, by an agent executing on the central processing unit, power consumption of each process of the plurality of processes according to the total power consumption, residency, and utilization using the plurality of power factors.

8. The method of claim 7, further comprising transmitting, by the agent, the power consumption of each process of the plurality of processes to an orchestrator.

9. The method of claim 7, further comprising measuring, by the operating system, the utilization by measuring at least one of idle, iowait, user, nice, irq, sofirq, or steal for each processor core of the plurality of processor cores.

10. The method of claim 7, further comprising:
obtaining, by the agent, hierarchy information describing software components executing on the central processing unit; and
aggregating, by the agent, power consumption of a portion of the plurality of processes according to the hierarchy information.

11. The method of claim 10, further comprising obtaining, by the agent, the hierarchy information using an application programming interface (API) for a container runtime interface executing on the central processing unit.

12. The method of claim 10, further comprising obtaining, by the agent, the hierarchy information from an orchestrator control plane executing on the central processing unit.

* * * * *